United States Patent
Tsai et al.

(10) Patent No.: US 8,807,934 B2
(45) Date of Patent: Aug. 19, 2014

(54) FAN MODULE

(75) Inventors: Ho-Chin Tsai, New Taipei (TW); Sheng-Hung Lee, New Taipei (TW); Li-Ping Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 512 days.

(21) Appl. No.: 13/207,760

(22) Filed: Aug. 11, 2011

(65) Prior Publication Data

US 2012/0148397 A1    Jun. 14, 2012

(30) Foreign Application Priority Data

Dec. 8, 2010 (TW) .............................. 99142902 A

(51) Int. Cl.
*F04D 29/64* (2006.01)

(52) U.S. Cl.
USPC ..................................... 415/213.1

(58) Field of Classification Search
CPC ..... F04D 29/60; F04D 29/601; F04D 29/602; F04D 209/644; F04D 29/646
USPC ............ 415/213.1, 214.1; 361/690, 692, 693, 361/694, 695
See application file for complete search history.

(56) References Cited

U.S. PATENT DOCUMENTS

| | | | |
|---|---|---|---|
| 7,522,415 B2 * | 4/2009 | Fan et al. | 361/695 |
| 8,246,301 B2 * | 8/2012 | Li | 415/213.1 |
| 8,272,852 B2 * | 9/2012 | Li | 417/423.14 |
| 2009/0284919 A1 * | 11/2009 | Tao et al. | 361/695 |
| 2010/0108847 A1 * | 5/2010 | Li | 248/309.1 |
| 2010/0232976 A1 * | 9/2010 | Li | 416/244 R |
| 2011/0135461 A1 * | 6/2011 | Li | 415/213.1 |
| 2012/0027580 A1 * | 2/2012 | Lu et al. | 415/214.1 |
| 2012/0148397 A1 * | 6/2012 | Tsai et al. | 415/213.1 |
| 2013/0108436 A1 * | 5/2013 | He et al. | 415/213.1 |

* cited by examiner

*Primary Examiner* — Edward Look
*Assistant Examiner* — Christopher R Legendre
(74) *Attorney, Agent, or Firm* — Novak Druce Connolly Bove + Quigg LLP

(57) ABSTRACT

A fan module includes a fan with an electrical connector, and a positioning member. The connector comprises an end portion and a head portion. The positioning member, mounted to the fan, comprises a first body and a second body located on the first body. The first body is mounted to a first side of the fan, and the second body is mounted to a second side of the fan, that is substantially perpendicular to the first side. The second body defines a mounting hole, a latching portion is located in the mounting hole, and a maintaining portion is also located on the first body of the positioning member. The head portion is inserted through the mounting hole, and the latching portion engages the head portion in the mounting hole. The end portion is located between the maintaining portion and the second body.

20 Claims, 5 Drawing Sheets

FAN MODULE

BACKGROUND

1. Technical Field

The present disclosure relates to a fan module, and particularly to a fan module used in a server.

2. Description of Related Art

A fan module is used for cooling in a computer or a server. The fan module includes a fan with an electrical connector and a frame used for mounting the fan. The fan is electronically connected to a circuit board of the computer or the server. Usually, the connector is secured to the frame with screws, or is left hanging out of the frame by some connecting wires, and the connection process is laborious and time consuming. Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
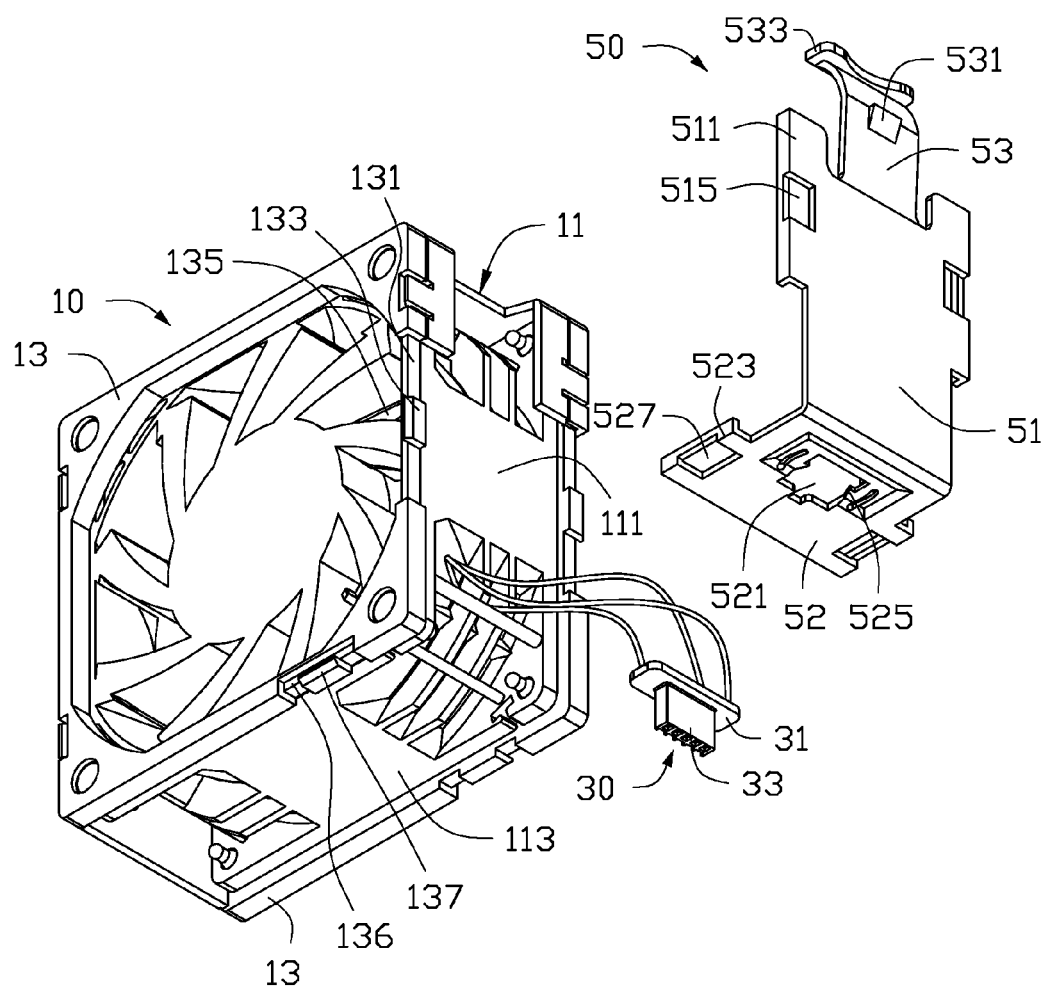
FIG. 1 is an exploded, isometric view of a fan module in accordance with an embodiment.

Referring to FIG. 1, a fan module in accordance with an embodiment includes a fan 10, a connector 30 and a positioning member 50.

The fan 10 includes a body 11 and two mounting boards 13. The two mounting boards 13 are mounted on opposite sides of the body 11. The body 11 includes two opposite sidewalls 111 and a bottom wall 113. Each mounting board 13 defines a venting hole 135. Each side edge of each mounting board 13 defines a first positioning slot 131. A first limiting block 133 is located in the first positioning slot 131. The bottom edge of each mounting board 13 defines a second positioning slot 136. A second limiting block 137 is located in the second positioning slot 136.

The connector 30 includes a end portion 31 and a head portion 33. A plurality of wires of the fan 10 connects to the head portion 33 through the end portion 31.

Figure 2:
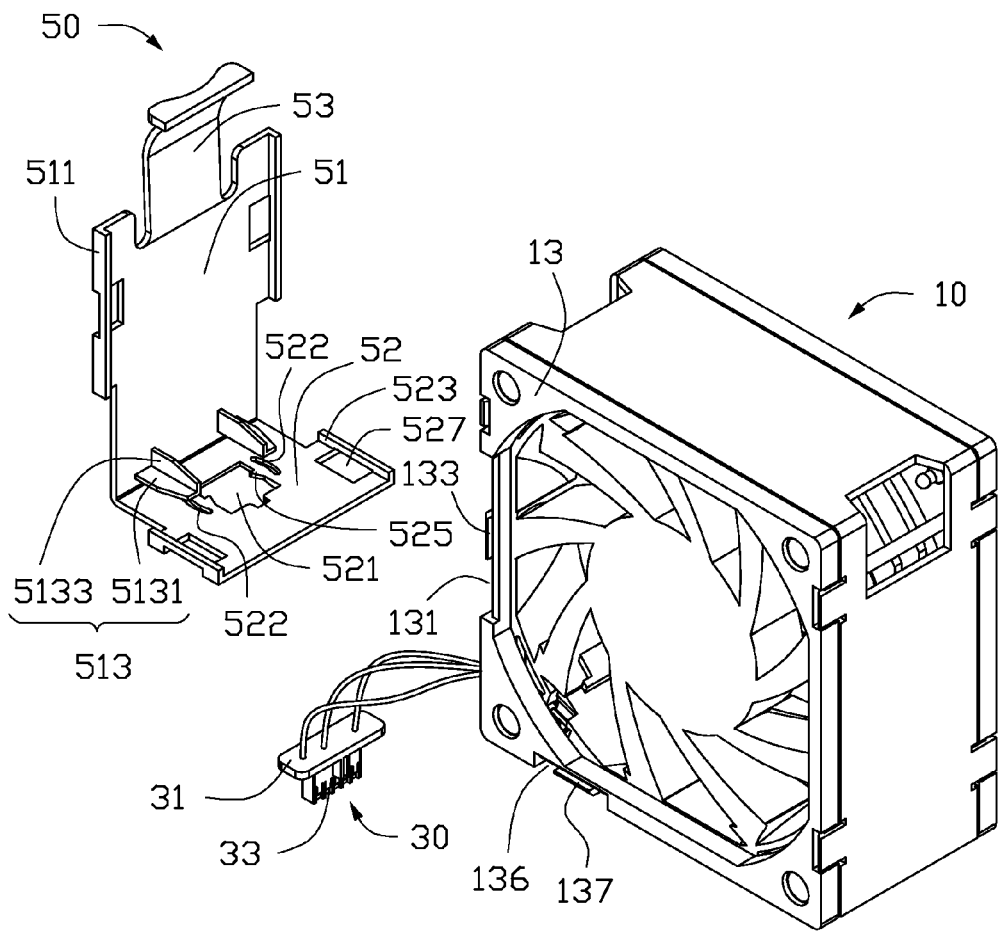
FIG. 2 is similar to FIG. 1, but viewed from another aspect.

Referring to FIG. 2, the positioning member 50 includes a first body 51, a second body 52, and an elastically deformable operating portion 53. The second body 52 extends from a first edge of the first body 51. The operating portion 53 extends from a second edge of the first body 51 opposite to the first edge. The second body 52 is substantially perpendicular to the first body 51. A first limiting portion 511 extends from each side edge of the first body 51. Two maintaining portions 513 extend from the first body 51, and are located on the corner between the first body 51 and the second body 52. Each first limiting portion 511 defines a first limiting hole 515. Each maintaining portion 513 includes a first maintaining piece 5131 and a second maintaining piece 5133. The first maintaining piece 5131 is substantially parallel to the second body 52, and the second maintaining piece 5133 is substantially perpendicular to the first body 51. The distance between the first maintaining piece 5131 and the second body 52 is substantially equal to the height of the end portion 31 of the connector 30. In one embodiment, the first maintaining piece 5131 is perpendicular to the second maintaining piece 5133. The second body 52 defines a mounting hole 521 and two openings 522. The mounting hole 521 is located between the two openings 522. A second limiting portion 523 extends from each of the side edges of the second body 52. An elastically deformable latching portion 525 extends from each of the two side edges of the mounting hole 521. Each second limiting portion 523 defines a second limiting hole 527. A latching block 531 extends outwards from the operating portion 53. An operating piece 533 extends from a free portion of the operating portion 53 opposite to the first body 51. The operating piece 533 is for driving the operating portion while it is elastically deformed. In one embodiment, the operating piece 533 is substantially parallel to the second body 52.

Figure 3:
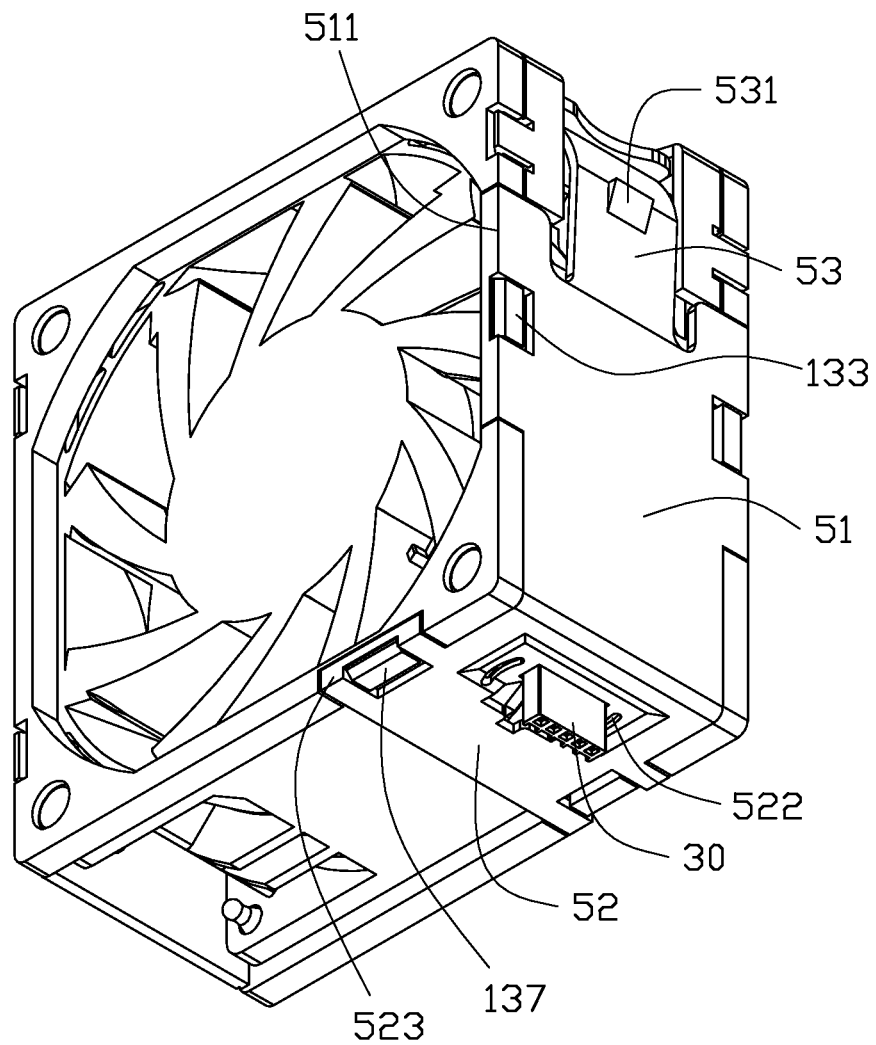
FIG. 3 is an isometric view of the assembled fan module of FIG. 1.

Referring to FIG. 3, in assembly, the positioning member 50 is moved to a position adjacent to the fan 10. The head portion 33 is inserted into the mounting hole 521, through the second body 52, and abuts the first edge of the mounting hole 521, furthest far away from the first body 51. The first body 51 is adjacent with the sidewall 111, and the second body 52 is adjacent with the bottom wall 113. The positioning member 50 is moved towards the fan 10 until the first limiting portion 511 is aligned with the first positioning slot 131, and the second limiting portion 523 is aligned with the second positioning slot 136. The positioning member 50 is pressed until the first limiting block 133 is engaged in the first limiting hole 515, and the second limiting block 137 is engaged in the second limiting hole 527. The first limiting portion 511 is received in the first positioning slot 131 and covers the first positioning slot 131. The second limiting portion 523 is received in the second positioning slot 136 and covers the second positioning slot 136. Thus, the positioning member 50 may be mounted to the fan 10. The connector 30 is moved towards the first body 51. The latching portion 525 is elastically deformed as the mounting hole 521 is expanded. The connector 30 is slid across the latching portion 525, until the head portion 33 abuts the second edge of the mounting hole 521, which is adjacent to the first body and opposite to the first edge. The latching portion 525 exerts elastic force to engage the connector 30 in the mounting hole 521 and prevent the connector 30 from moving along a first direction, which is substantially perpendicular to the first body 51. The end portion 31 is located between the first maintaining piece 5131 and the second body 52, to prevent the connector 30 from moving along a second direction substantially parallel to the first body 51. In this way, the connector 30 is mounted to the fan 10.

In disassembly, the latching portion 525 is driven to elastically deform and expand the mounting hole 521. The connector 30 can then be disengaged from the latching portion 525 and removed from the mounting hole 521.

Figure 4:
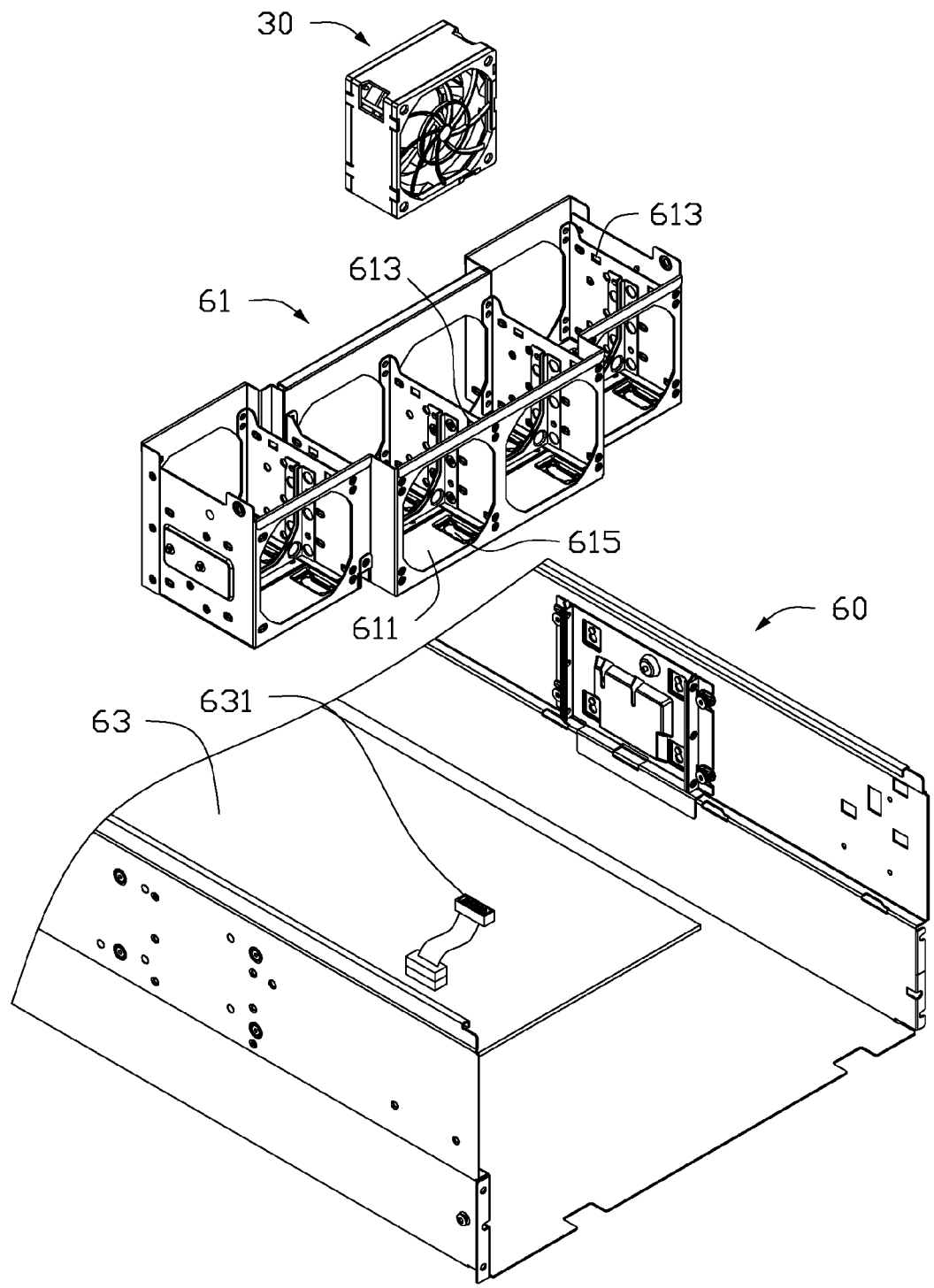
FIG. 4 is an exploded, isometric view of the fan module, a frame and a chassis.
Figure 5:
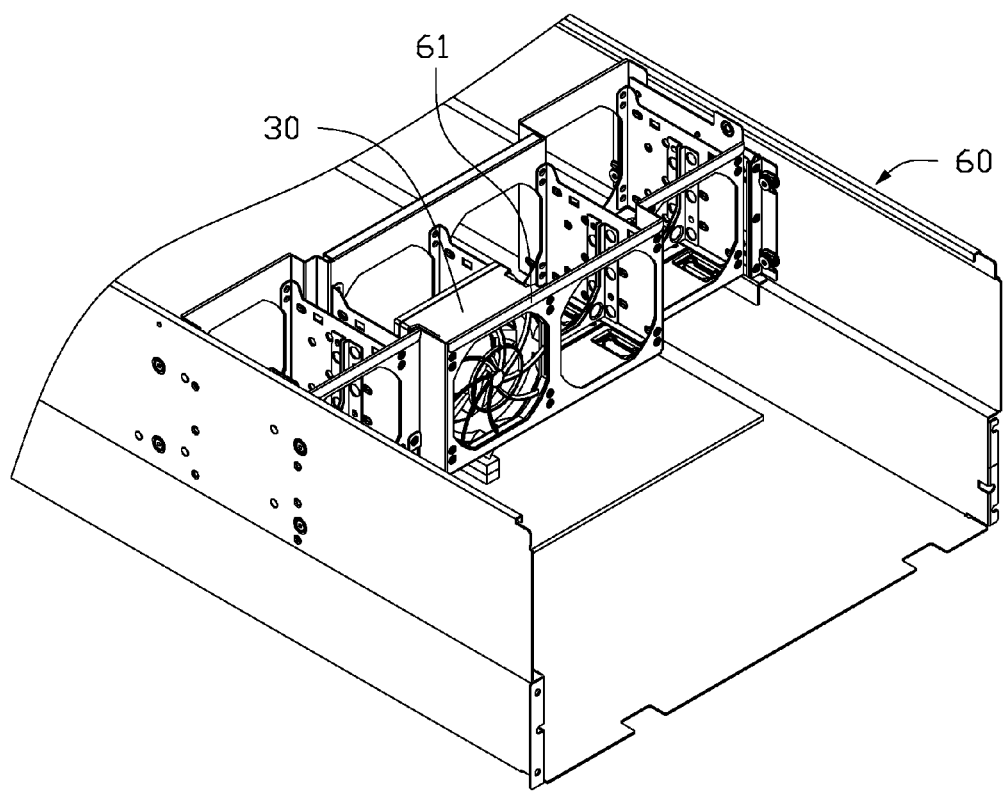
FIG. 5 is an isometric view of the items of FIG. 4 assembled together.

Referring to FIG. 4 and FIG. 5, the positioning member 50 is further adapted to mount the fan module to a chassis 60. A circuit board 63 is mounted to the chassis 60. A plurality of mounting frames 61 is secured to the chassis 60. A plurality of inserting ends 631 is mounted to the circuit board 63 (only one inserting end 631 is shown in FIG. 4 and FIG. 5). Each mounting frame 61 defines a receiving space 611, a latching hole 613 and a through hole 615. The fan module is received in the receiving space 611. The connector 30 is inserted in and through the through hole 615. The latching block 531 is engaged in the latching hole 613. The inserting end 631 is connected to the connector 30, to connect the connector 30 to the circuit board 63. In disassembly of the fan module from the chassis 60, the inserting end 631 is disconnected from the connector 30. The operating portion 53 elastically deforms, and the latching block 531 is disengaged from the latching hole 613. The fan module can thereby be removed.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and the arrangement of parts within the principles of the disclosure, to the full extent indicated by the broad general meaning of the terms in which the appended claims are expressed.

What is claimed is:

1. A fan module comprising:
a fan with a connector, and the connector comprising an end portion and a head portion; and
a positioning member, mounted to the fan, comprising a first body and a second body connected to the first body; the first body is mounted to a first side of the fan, and the second body is mounted to a second side of the fan, that substantially perpendicular to the first side;
wherein the second body defines a mounting hole, a latching portion is located in the mounting hole, and a maintaining portion is located on the first body; the head portion is inserted through the mounting hole, and the latching portion engages the head portion in the mounting hole, to prevent the connector from moving along a first direction substantially perpendicular to the first body; and the end portion is located between the maintaining portion and the second body, to prevent the connector from moving along a second direction that is substantially parallel to the first body.

2. The fan module of claim 1, wherein the second body defines an opening, to drive the latching portion elastically deformed.

3. The fan module of claim 1, wherein the first body is substantially perpendicular to the second body.

4. The fan module of claim 1, wherein the maintaining portion comprises a first maintaining piece and a second maintaining piece, and the head portion is located between the first maintaining piece and the second body.

5. The fan module of claim 4, wherein the first maintaining piece is substantially parallel to the second body, and the second maintaining piece is substantially perpendicular to the second body.

6. The fan module of claim 1, wherein the first side defines a first positioning slot, a first limiting portion extends from the first body, the first limiting portion is received in the first positioning slot and covers the first positioning slot.

7. The fan module of claim 6, wherein a first limiting block is located in the first positioning slot, the first limiting portion defines a first limiting opening, and the first limiting block is engaged in the first limiting opening.

8. The fan module of claim 1, wherein the second side defines a second positioning slot, a second limiting portion extends from the second body, and the second limiting portion is received in the second positioning slot and covers the second positioning slot.

9. The fan module of claim 8, wherein a second limiting block is located in the second positioning slot, the second limiting portion defines a second limiting opening, and the second limiting block is engaged in the second limiting opening.

10. The fan module of claim 1, wherein the positioning member further comprises an elastically deformable operating portion, and the elastically deformable operating portion extends from the first body; an operating block extends from the elastically deformable operating portion and is adapted to be engaged with a mounting frame for mounting the fan.

11. The fan module of claim 10, wherein an operating piece extends from the elastically deformable operating portion and is operable to deform the elastically deformable operating portion, and the operating piece is substantially parallel to the second body.

12. A fan module comprising:
a fan with a connector, a first side of the fan defining a first positioning slot, and a first limiting block located in the first positioning slot; a second side of the fan, substantially perpendicular to the first side, defining a second positioning slot, and a second limiting block located in the second positioning slot; and
a positioning member comprising a first body and a second body connected to the first body; a first limiting portion extending from the first body, and a second limiting portion extending from the second body; the first limiting portion defining a first limiting opening, and the second limiting portion defining a second limiting opening;
wherein the second body defines a mounting hole, a latching portion is located in the mounting hole, and the latching portion engages the connector in the mounting hole; the first limiting portion is received in the first positioning slot, and the first limiting block is engaged in the first limiting opening; the second limiting portion is received in the second positioning slot, and the second limiting block is engaged in the second limiting opening.

13. The fan module of claim 12, wherein the second body defines an opening, to drive the latching portion elastically deformed.

14. The fan module of claim 12, wherein the first body is substantially perpendicular to the second body.

15. The fan module of claim 12, wherein the connector comprises an end portion and a head portion, the end portion is inserted through the mounting hole and engaged in the mounting hole by the latching portion, and the head portion abuts the second body.

16. The fan module of claim 15, wherein a maintaining portion is located on the first body, and the head portion is located between the maintaining portion and the second body.

17. The fan module of claim 16, wherein the maintaining portion comprises a first maintaining piece and a second maintaining piece, the head portion is located between the first maintaining piece and the second body.

18. The fan module of claim 17, wherein the first maintaining piece is substantially parallel to the second body, and the second maintaining piece is substantially perpendicular to the second body.

19. The fan module of claim 12, wherein the first limiting portion covers the first positioning slot.

20. The fan module of claim 12, wherein the second limiting portion covers the second positioning slot.

\* \* \* \* \*